Sept. 19, 1961 R. R. KIECKER 3,000,164
COMBINED CORN PICKING AND STALK SEVERING DEVICE
Filed June 16, 1959 3 Sheets-Sheet 1
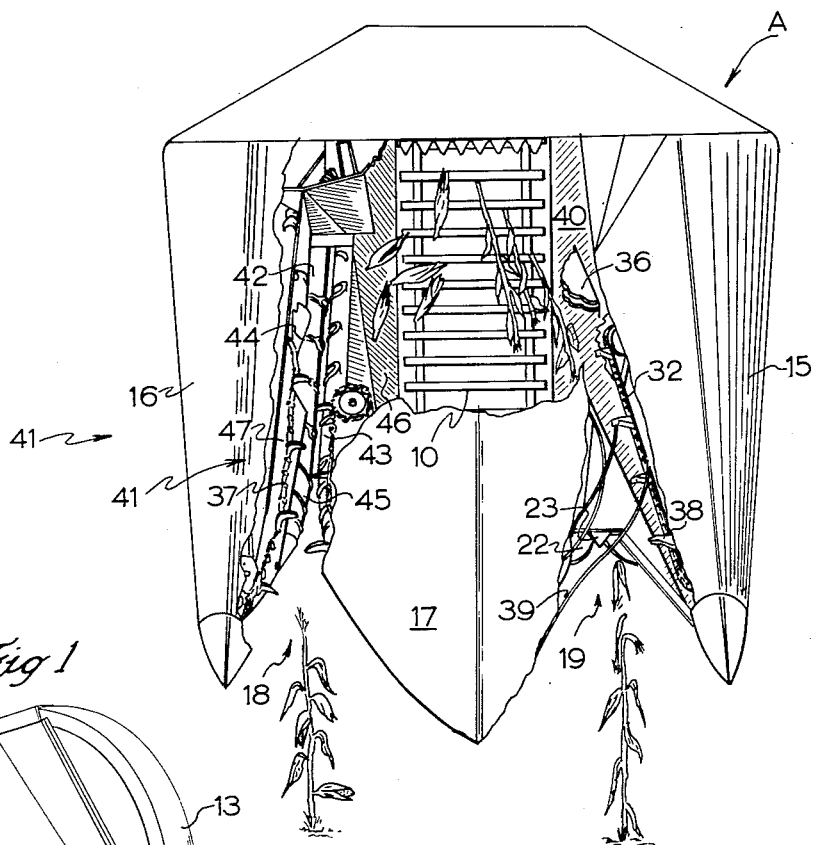
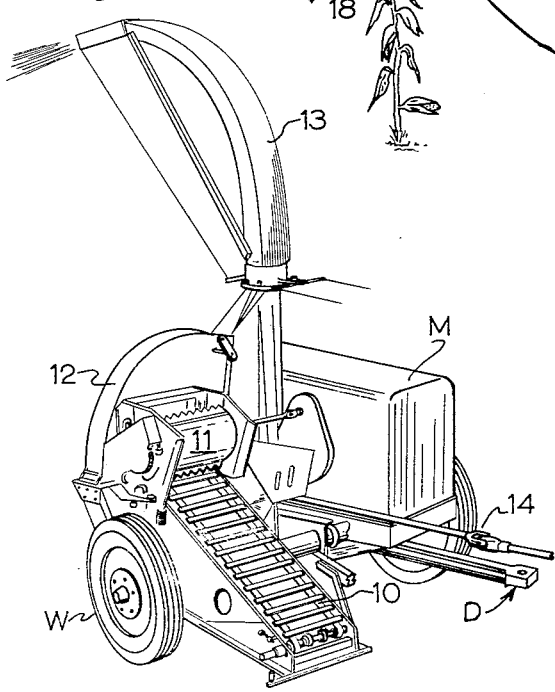
INVENTOR.
Raymond R. Kiecker
By His Attorneys
Williamson, Schroeder & Palmatier

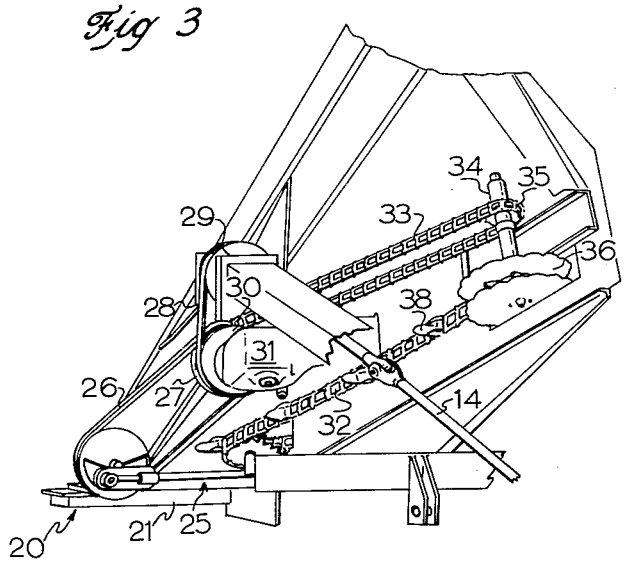
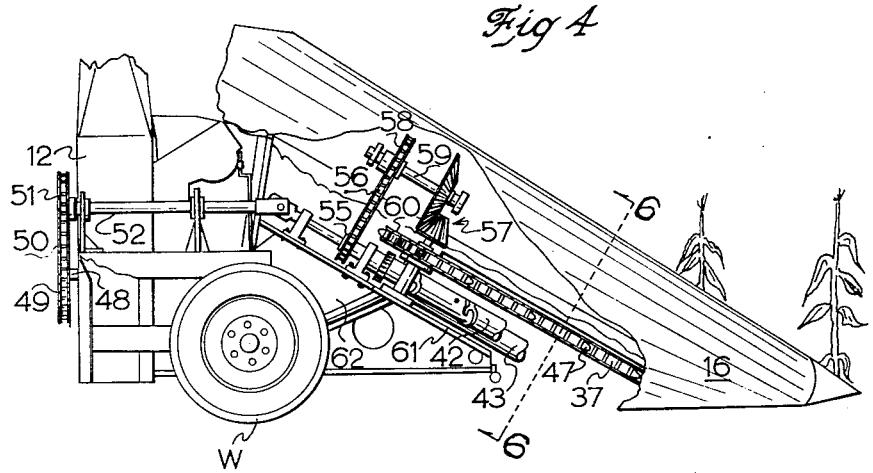
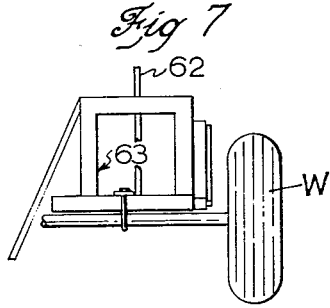

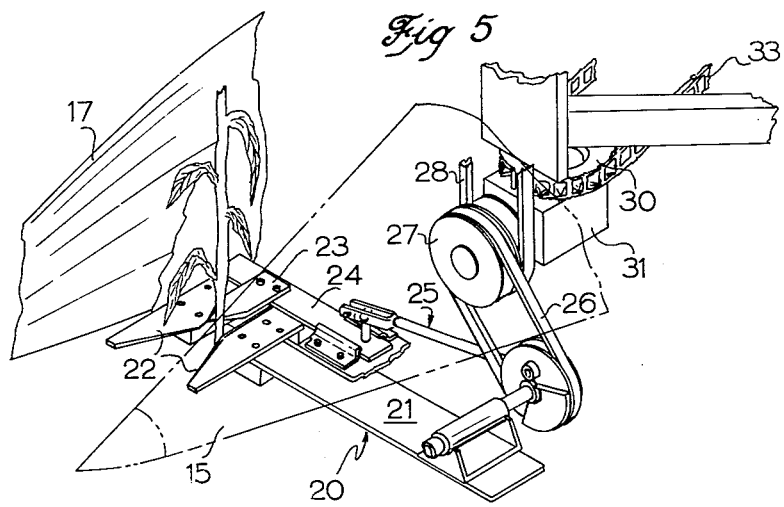
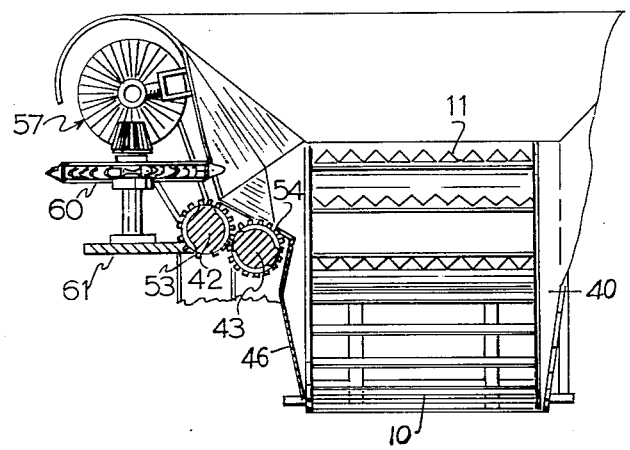

United States Patent Office 3,000,164
Patented Sept. 19, 1961

3,000,164
COMBINED CORN PICKING AND STALK
SEVERING DEVICE
Raymond R. Kiecker, Rte. 1, Box 34, Hector, Minn.
Filed June 16, 1959, Ser. No. 820,717
1 Claim. (Cl. 56—16)

This application relates in general to forage or ensilage harvesters and in particular to a two-row forage harvester for corn. There are presently available numerous forage harvesting machines, both single and multiple row, which are adapted to cut or gather the previously harvested stalks from which the majority of the ears of corn have been picked and reduce the same as by cutting or chopping to a form suitable for use as silage feed crop for animals. Such forage apparatus presently available gathers the entire stalk into the machine including any ears of corn remaining thereon and all of the gathered material including the ears and stalks of corn are then fed to a chopping or cutting unit where it is reduced to silage. Apparatus such as this has the disadvantage of a disproportionate ratio of stalk to corn so that the silage is not as rich in corn as might be desired.

Therefore, an important object of my invention is a novel forage harvesting apparatus which produces thoroughly mixed silage in a single operation with a higher corn content than is possible with presently available apparatus.

Still another object is a forage harvester of the class described which is adapted to harvest at least two rows of standing corn stalks simultaneously.

A more specific object is a forage harvester of the class described which is adapted to harvest two adjacent rows of previously picked corn stalks simultaneously, gathering substantially the entire stalk from one of said rows while simultaneously stripping or picking only the ears of corn from said adjacent row and leaving the stalk in said adjacent row standing after passage of the harvesting apparatus therethrough.

A further object is a forage harvester of the class described in which the harvesting attachment is readily demountable from the reducing or chopping unit to permit said unit to be employed with harvesting attachments suitable for use with other types of field or row crops.

These and other objects and advantages of my invention will more fully appear from the following description made in connection with the accompanying drawings wherein like reference characters refer to the same or similar parts throughout the several views, and in which:

FIG. 1 is a perspective view of the reducing or base unit of my invention with the harvesting attachment removed therefrom;

FIG. 2 is a front perspective view looking somewhat downwardly and in partial section showing the harvesting attachment mounted on the base reducing unit with portions of the reducing unit removed;

FIG. 3 is a rear perspective view taken from the left rear side illustrating the drive mechanism for the stalk cutting and gathering unit of the harvester attachment;

FIG. 4 is a partial right side elevational view with portions broken away showing the corn picking unit of the harvesting attachment;

FIG. 5 is a detail perspective view of the sickle bar attachment;

FIG. 6 is a vertical sectional view taken on the line 6—6 of FIG. 4;

FIG. 7 is a fragmentary rear elevational view of the picking unit.

Referring to the drawings which illustrate a preferred embodiment of my invention, and particularly to FIG. 1 which illustrates a common, well known type of mobile reducing or base unit upon which the gathering attachment is adapted to be mounted, the reducing unit includes a suitable frame structure upon which is mounted a feeding apron including a downwardly inclined continuously upwardly moving conveyor belt 10 which has disposed adjacent thereto at the upper or delivery end thereof a revolving feed roll or drum 11 having radially extending longitudinally disposed serrated ends extending outwardly therefrom for feeding or delivering the harvested material or crops from the conveyor belt into the crop reducing chamber 12. The crop reducing chamber 12 is provided with a suitable housing within which is journalled a cutter head or rotor of a type well known to those skilled in the art having a plurality of knives for reducing the crops fed to the chamber and thoroughly intermixing them and blower elements which causes the reduced crops to be discharged tangentially from the chamber 12 via an upwardly and rearwardly curved overhead discharge spout or delivery chute 13.

The base unit is provided with suitable transport wheels W and a source of power or drive means such as the motor M. Any suitable means may be provided for driving the cutter, the conveyor and the feed roll from the motor M. The base unit is also provided with draft means D for connection to a tractor (not shown).

The base unit is also provided with a universal drive shaft 14 for operating the stalk gathering and cutting portion of the harvesting attachment hereinafter to be described.

The harvesting attachment indicated as an entirety by A is adapted to be mounted forwardly on the base unit of FIG. 1 in any suitable fashion and is best seen in FIG. 2. The harvesting attachment is provided with a rigid frame upon which are mounted the harvesting elements which includes a corn picking unit disposed on the left side thereof as viewed from the front as in FIG. 2 and a stalk cutting and gathering unit on the right side thereof also best seen in FIG. 2. The stalk gathering and corn picking units are enclosed on top by suitable overlying streamlined tapered shields or fenders 15 and 16 respectively which cooperate with a tapered central shield 17 which overlies the feeding apron of the base unit in attached mounted relationship to form stalk receiving throats 18 and 19 through which the stalks move rearwardly to ultimately be fed to the feeding apron.

The stalk gathering unit includes a sickle bar unit indicated generally by 20 and best seen in FIG. 5, disposed below the stalk gathering unit and cooperatively disposed with respect to throat 19. The sickle bar unit includes a sickle arm 21 upon which are mounted a pair of stationary knife blades 22 and a contiguously overlying reciprocating double edged knife blade 23 reciprocating therebetween and cooperating therewith to sever the stalks a short distance above the ground as they are fed thereto via the throat 19.

The blade 23 is fixedly mounted on a slidable bar 24 which is provided with reciprocating movement as by the pitman oscillator 25 mounted adjacent the outer end of the sickle arm 21. The pitman oscillator is driven by a belt 26 which is drivingly interconnected with or trained about a double sheave 27, which also has trained about it a drive belt 28 which transmits driving power to the double sheave from an overhead drive pulley 29 which in turn is drivingly connected to the universal drive shaft 14. The double sheave 27 also transmits driving power to the sprocket wheel 30 through the medium of a gear box 31. The sprocket wheel 30 transmits driving power to the gathering chain 32 through an endless chain 33 trained about it and driving a shaft 34 through the medium of a drive sprocket 35 carried by said shaft. The lower end of said shaft 34 acrries a sprocket wheel 36 which drives an endless stalk gathering chain 32 having a plurality of stalk engaging fingers 38 extending outwardly therefrom throughout the length thereof. Half of the gathering chain 32 lies in a stalk gathering throat 19 and is continuously driven rearwardly therein, the fingers 38 engaging the stalks and drawing them rearwardly and upwardly and delivering the severed stalks to the endless conveyor 10 of the feed apron.

The stalk gathering unit is also provided with a plurality of curvilinear yieldable guide bars or stalk deflectors 39 affixed to the central shield 17 and extending to the shield 15 which aid in directing the stalks to the gathering chain. These deflectors 39 urge or direct the stalks towards the gathering chain into engagement with the gathering fingers 38. The stalks are then carried rearwardly by the fingers and discharged onto the conveyor 10 by the gatherer guide panel 40 which in turn delivers the stalks to reduction chamber 12 for chopping and mixing and conversion to silage.

The corn picking unit indicated generally by 41 is disposed on the left side of the gathering assembly as viewed from the front and includes a pair of rearwardly and upwardly inclined snapping rollers 42 and 43 disposed in parallel relationship to one another and generally parallel to the feeding apron and slightly thereabove and outwardly adjacent the marginal edge of said apron. These snapping rolls rotate toward one another and are disposed in slightly spaced apart relationship to one another to permit the passage of the stalks therebetween with the inner snapping roll 43 being disposed slightly below the outer snapping roll 42, as best seen in FIG. 6. The snapping rolls carry on their upper periphery a plurality of spaced apart, staggered raised snapping lugs 44 familiar to those skilled in the art. The lower periphery of the rolls are provided with raised spirals 45 which engage the stalks and positively direct them rearwardly to the snapping lugs. The snapping lugs are adapted to engage the ears of corn remaining on the stalks and twist or snap the same therefrom. The ears of corn when removed from the stalks fall onto a downwardly inclined chute 46 which is disposed between the inner snapper roll 43 and the feeding apron and directs the snapped ears onto the conveyor 10 and into the chopping or reduction chamber 12. The stalks are freed or released by the rolls and permitted to remain standing after the ears of corn have been snapped therefrom.

An endless gathering chain 37 having a plurality of suitable gathering fingers 47 extending outwardly therefrom in spaced apart relationship into the stalk receiving throat 18 is also provided just above the snapping rolls and slightly to the outside thereof and are adapted to pull the stalks rearwardly into cooperative engagement with the snapping rolls.

In the form illustrated, the corn picking unit 41 is powered and driven by means of a suitable drive mechanism interconnected with the drive shaft 48 of the blower and chopping unit. This drive shaft 48 extends rearwardly of the chopper and blower housing 12 carried by the base unit and carries a drive sprocket 49 thereon which is interconnected by an endless chain 50 trained thereabout to another drive sprocket 51 which is drivingly connected with the horizontal leg of the universal drive shaft 52 disposed just to the rear of the picking unit. The lower inclined portion of the universal drive shaft 52 is drivingly connected to the outer snapping roll 42 which carries rearwardly thereof a spur gear 53 which meshes with and drives a corresponding spur gear 54 on the inner snapping roll 43. The lower portion of the drive shaft 52 also carries a sprocket 55 about which is trained an endless chain 56 which drives the bevel gear unit 57 through the medium of a sprocket 58 carried by the bevel gear shaft 59. The bevel gear mechanism has a sprocket 60 which in turn drives the endless gathering chain 37.

The snapping unit, including the immediate drive mechanism therefor, is mounted on and supported by a rigid inclined supporting member 61 which is rigidly secured to and mounted on a vertical supporting plate 62 of generally triangular configuration which in turn is carried and supported by a rigid rectangular vertical transversely disposed frame indicated in its entirety by 63.

In use and operation, the gathering assembly is mounted on the base unit of FIG. 1 in such fashion as to be rigidly secured thereto and transported or carried thereby. The harvester is then passed down adjacent rows of corn stalks which have previously been harvested to remove the majority of the ears of corn therefrom with the stalk receiving throat 18 and 19 being in substantial alignment with the adjacent rows of corn. Substantial amounts of corn remain on the stalks after the initial picking or harvesting thereof and it is these remaining ears which the corn picking unit is adapted to remove and feed to the chopping unit. As the harvester passes down the rows of corn stalks, the stalk gathering unit disposed on the right side thereof cuts substantially the entire length of the stalks in the row in which it is following and gathers them in and feeds them directly to the feeding apron from whence they are fed into the chopping or reduction unit, reduced to silage form, and then blown thereout into a trailing vehicle following behind (not shown).

At the same time, the corn picking unit simultaneously engages the corn stalks of the adjacent row and gathers the stalks therebetween but does not unearth or pull up the corn stalks and since the sickle unit does not extend to the picking unit there is no cutting of the stalks engaged by the picking unit and they are simply temporarily disposed between the snapping roll, which, as they revolve towards one another cause the ears of corn to be broken off or snapped from the stalks, the ears of corn then being directed inwardly along the chute to the feeding apron and from thence into the chopping unit, where they too are reduced to silage form. After the ears of corn have been removed from the stalks, there is no longer anything to hold the stalks between the snapping rolls and they pass therebetween and therebehind and are left standing in the fields.

From the foregoing description, the advantages of my invention are readily apparent. Since the picking unit leaves the stalks behind and picks up only the ears of corn remaining on the stalks, the ratio of corn to stalks is substantially increased and generally on the order of twice as much since only half as many stalks are being reduced and mixed with the remaining ears of corn as would be the case with presently available apparatus. Thus, the farmer has formed directly in a single continuous operation a substantially enriched silage which needs no further mixing or processing and which may be taken directly to the silo. Further, the gathering assembly including the picking unit and the stalk gathering unit are integrally united to form a single attachment which may readily be detachably mounted on a base reduction unit such as the type disclosed, and readily dismounted therefrom when not in use to permit the base unit to be employed with other harvesting attachments.

It will, of course, be understood that various changes may be made in the form, details, arrangement and proportions of the various parts without departing from the scope of my invention.

What I claim is:

A forage harvester for treating adjacent rows of standing stalks of corn simultaneously comprising in combination a mobile reducing unit including crop reducing and mixing means, and a forwardly projecting downwardly inclined continuous conveyor communicating with said crop reducing means and conveying harvested crops thereto, and a harvesting attachment detachably and cooperatively mounted on said reducing unit, said attachment including a housing structure overlying and overlapping said conveyor and having rearwardly extending stalk receiving throats disposed on each side of said conveyor adjacent the marginal edges thereof, said throats receiving therein the standing stalks of said adjacent rows of corn, stalk severing means carried by said attachment and severing the stalks received in one of said throats and stalk gathering means engaging and carrying said severed stalks rearwardly for delivery to said conveyor, and corn picking means including snapping rolls receiving the stalks entering said other throat therebetween and snapping the ears of corn therefrom and directing them inwardly to said conveyor and releasing the stripped stalks therefrom to remain standing in the field, said severed stalks and snapped ears being delivered continuously and simultaneously to the crop reducing means by said conveyor for simultaneous reduction and intermixing thereof.

References Cited in the file of this patent
UNITED STATES PATENTS

| | | |
|---|---|---|
| 2,348,634 | McEachern | May 9, 1944 |
| 2,658,319 | Hansen | Nov. 10, 1953 |
| 2,669,824 | Dwyer | Feb. 23, 1954 |
| 2,763,115 | Skromme | Sept. 18, 1956 |